(12) United States Patent
Pyzyna et al.

(10) Patent No.: US 11,375,691 B2
(45) Date of Patent: Jul. 5, 2022

(54) LIQUID DISPENSER

(71) Applicant: SENESTECH, INC., Flagstaff, AZ (US)

(72) Inventors: Brandy Pyzyna, Flagstaff, AZ (US); Thomas Goth, Flagstaff, AZ (US); Philip Blank, Flagstaff, AZ (US)

(73) Assignee: SENESTECH, INC., Flagstaff, AZ (US)

( * ) Notice: Subject to any disclaimer, the term of this patent is extended or adjusted under 35 U.S.C. 154(b) by 0 days.

(21) Appl. No.: 16/758,301

(22) PCT Filed: Jun. 19, 2018

(86) PCT No.: PCT/US2018/038161
§ 371 (c)(1),
(2) Date: Apr. 22, 2020

(87) PCT Pub. No.: WO2019/083571
PCT Pub. Date: May 2, 2019

(65) Prior Publication Data
US 2020/0337267 A1 Oct. 29, 2020

Related U.S. Application Data

(60) Provisional application No. 62/576,224, filed on Oct. 24, 2017.

(51) Int. Cl.
*A01K 7/02* (2006.01)
*A01M 1/20* (2006.01)
(Continued)

(52) U.S. Cl.
CPC ........... *A01K 7/025* (2013.01); *A01M 1/2005* (2013.01); *A01M 25/002* (2013.01); *B67D 3/009* (2013.01); *B67D 3/0061* (2013.01)

(58) Field of Classification Search
CPC ... A01K 7/025; A01M 1/2005; A01M 25/002; B67D 3/0061; B67D 3/009
(Continued)

(56) References Cited

U.S. PATENT DOCUMENTS 4,840,143 A * 6/1989 Simon .................. A01K 5/0225
119/52.1
6,971,331 B1 * 12/2005 Rohrer ..................... A01K 7/02
119/52.1
(Continued)

FOREIGN PATENT DOCUMENTS

EP            1477056 A1 * 11/2004  ............. A01K 7/005
WO    WO 201 7/031056 A1     2/2017
WO       WO-2017031056 A1 *  2/2017  .......... A01M 25/004

OTHER PUBLICATIONS

International Search Report and Written Opinion dated Sep. 7, 2018 in PCT/US2018/038161 filed on Jun. 19, 2018.

*Primary Examiner* — Paul R Durand
*Assistant Examiner* — Michael J. Melaragno
(74) *Attorney, Agent, or Firm* — Oblon, McClelland, Maier & Neustadt, L.L.P.

(57) ABSTRACT

A liquid dispenser is described, having a tank configured to deliver and present a liquid in a drink basin within a tray base. The liquid may be a liquid bait for population control of small animals. To reduce evaporation and liquid waste, the tray base may be partially covered by a tray top. A spill basin may surround the drink basin, and may be configured so that tilting or inverting the liquid dispenser drains a liquid from the spill basin and drink basin back into the tank.

19 Claims, 12 Drawing Sheets

(51) Int. Cl.
  *A01M 25/00*    (2006.01)
  *B67D 3/00*    (2006.01)
(58) Field of Classification Search
  USPC .......................................................... 119/72
  See application file for complete search history.

(56) References Cited

U.S. PATENT DOCUMENTS

| | | | |
|---|---|---|---|
| 7,146,930 B1* | 12/2006 | Ness | A01K 7/02 |
| | | | 119/77 |
| 7,310,908 B2 | 12/2007 | Bernard et al. | |
| 10,759,647 B1* | 9/2020 | Fabozzi | B67D 3/0083 |
| 2006/0231040 A1 | 10/2006 | Bast et al. | |
| 2011/0132268 A1* | 6/2011 | Weber | A01K 7/025 |
| | | | 119/72 |
| 2012/0132143 A1 | 5/2012 | Parks et al. | |
| 2019/0023462 A1* | 1/2019 | Shields | B65D 41/20 |

* cited by examiner

LIQUID DISPENSER

CROSS REFERENCE TO RELATED APPLICATIONS

This application claims the benefit of priority from U.S. Provisional Application No. 62/576,224 filed Oct. 24, 2017, which is incorporated herein by reference in its entirety.

BACKGROUND OF THE INVENTION

Technical Field

The present invention relates to a dispenser that comprises a removably attached tank configured to supply a liquid to a drinking area.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Liquid bait dispensers may be used to maintain a level of a liquid bait within a drinking area. Typically, these dispensers include a tank or reservoir of liquid bait to refill the drinking area. However, these dispensers tend to waste liquid bait. For instance, these dispensers are prone to significant liquid loss from evaporation. Additionally, jostling or moving the liquid dispenser may spill liquid bait that can no longer be recovered. Furthermore, in replacing the tank or reservoir, there may be no easy way to reclaim the liquid bait that is already held within the bottom part of the dispenser.

In view of the forgoing, one objective of the present invention is to provide a liquid dispenser comprising a tank removably attached to a tray top and tray base. The tank delivers a liquid through a covered trough to a drink basin. The trough and drink basin are furthermore bordered by a covered spill basin to capture spills and minimize loss to evaporation. By inverting the liquid dispenser, liquid in both the spill basin and the drink basin may be drained back to the tank, which further minimizes liquid loss.

BRIEF SUMMARY OF THE INVENTION

According to a first aspect, the present disclosure relates to a liquid dispenser, which comprises a tank with a discharge port, a tray top having a drinking area and an engagement port engaged with the discharge port, and a tray base attached to the tray top. The tray base has a tank basin in fluid communication with a drink basin and at least one spill basin adjacent to a perimeter of the tank basin and a perimeter of the drink basin. The at least one spill basin is configured to drain a liquid in the spill basin back to the tank when the liquid dispenser is inverted.

In one embodiment, only one spill basin is present and is in contact with opposite edges of the drink basin and with opposite edges of the tank basin.

In one embodiment, an edge of the tank basin farthest from the drink basin is connected to a side of the tray base and not bordered by the spill basin.

In one embodiment, the one spill basin has one continuous bottom profile.

In a further embodiment, the continuous bottom profile is substantially parallel with a bottom edge of the tray base.

In a further embodiment, the only one spill basin has interior walls that connect to the continuous bottom profile through curved bottom edges.

In a further embodiment, the tank basin is connected to the drink basin through a feeder trough, and the feeder trough is bordered on both sides by the at least one spill basin.

In a further embodiment, the length of the feeder trough is 25-60% of an inner diameter of the engagement port.

In a further embodiment, the drink basin, feeder trough, and tank basin share a continuous planar bottom.

In a further embodiment, the continuous planar bottom slopes down towards the drink basin at an angle of 2°-30° relative to a bottom edge of the tray base.

In a further embodiment, interior walls of the drink basin, the feeder trough, and the tank basin connect to the continuous planar bottom through curved bottom edges.

In one embodiment, a perimeter of the drinking area has a downward sloping drink edge configured to be in contact with a liquid dispensed from the tank into the drink basin.

In one embodiment, the downward sloping drink edge has at least one air vent.

In one embodiment, the tray top has a curved molding connecting a continuous, raised surface surrounding the drinking area and connecting with an outer periphery of the engagement port.

In one embodiment, the tray top and the tray base contact through a complementary fitting that surrounds the spill area and tank basin.

In one embodiment, the engagement port and the discharge port are removably attached by screw threads.

In one embodiment, the discharge port and the engagement port have positive stops configured to contact each other when the tank is securely fastened.

In a further embodiment, an inner circumference of the engagement port seals against an outer circumference of the tank discharge port.

In one embodiment, the tank basin comprises a lance configured to break a seal covering an opening of a discharge port of a tank being inserted.

In one embodiment, the tank includes a label or indicia to show a direction for inverting.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
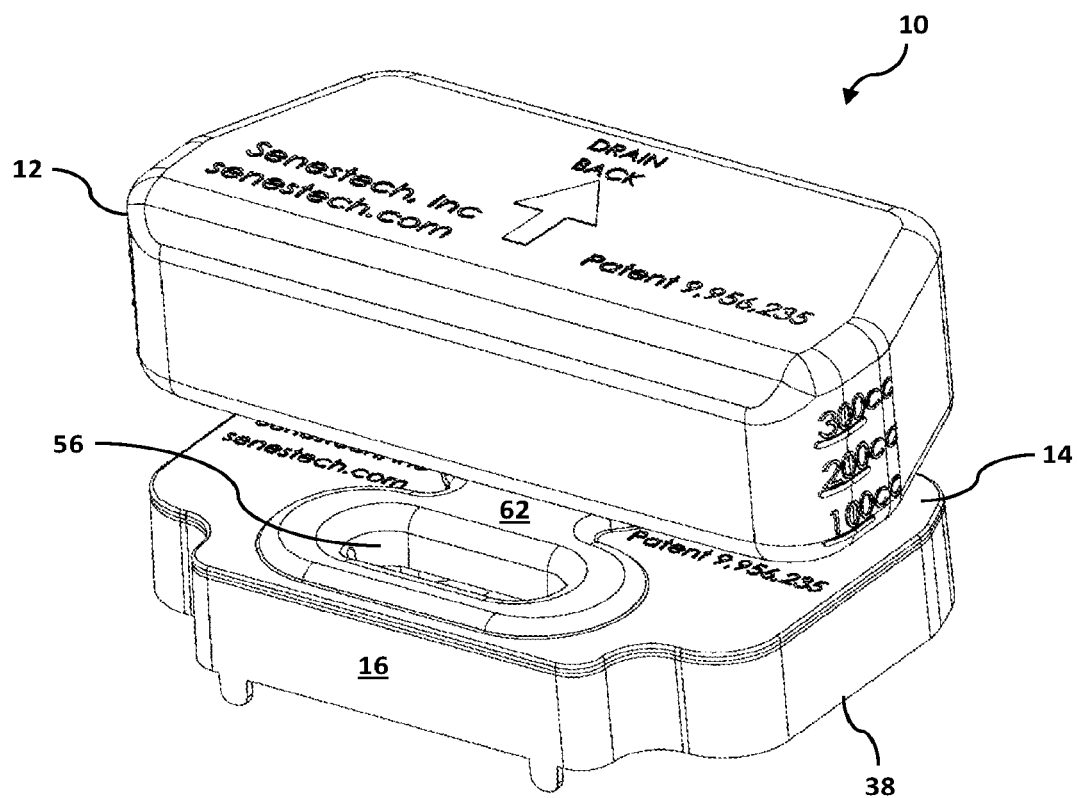
FIG. 1 is a liquid dispenser having a tray base, a tray top, and a tank.

Embodiments of the present disclosure will now be described more fully hereinafter with reference to the accompanying drawings, in which some, but not all embodiments of the disclosure are shown. Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments. Further, it is intended that embodiments of the disclosed subject matter cover modifications and variations thereof.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As defined here, "substantially perpendicular" refers to the dihedral angle between two intersecting planes, or the smallest angle between a plane and an intersecting line being in a range of 75°-90°, preferably 80°-90°, more preferably 85°-90°, even more preferably 87°-90°, or about 90°. Two intersecting planes or a line and a plane being perpendicular means that an angle of exactly 90° is formed between them.

As defined here, two planes being "substantially parallel" is defined as having a line normal (i.e. perpendicular) to one plane intersecting the other plane at a substantially perpendicular angle. Where two planes are exactly parallel to one another, a line normal to one plane is normal to the other plane.

According to a first aspect, the present disclosure relates to a liquid dispenser 10, which comprises a tank 12 with a discharge port 72, a tray top 14 having a drinking area 52 and an engagement port 54 engaged with the discharge port, and a tray base 16 attached to the tray top 14. In some embodiments, the tank, tray top, and tray base may be separated from one another and sold as a kit. In another embodiment, the tank, tray top, and tray base may be partly attached, for instance, with the tray top and the tray base connected together with the tank being separated, but configured to removably attach to the tray top.

The tank 12, tray top 14, and tray base 16 may comprise polylactic acid (PLA), poly(lactic-co-glycolic acid) (PLGA), polyvinylchloride (PVC), polyethylene terephthalate (PET), acrylonitrile butadiene styrene (ABS), melamine, polypropylene (PP), polystyrene (PS), polytetrafluoroethylene (PTFE), polyetheretherketone (PEEK), poly etherketoneketone (PEKK), polycarbonate (PC), polyethylene (PE), high density polyethylene (HDPE), carbon fiber, or some other polymeric material. In alternative embodiments, the tank, tray top, and/or tray base may comprise metal (such as aluminum or stainless steel), glass, ceramic, rubber, or other materials. In a further embodiment, the tank, tray top, and/or tray base may comprise any solid material that does not adversely react with the liquid being dispensed. The tank, tray top, and/or tray base may be made by injection molding, press forming, thermoforming, blow molding, rotational molding, stamping, casting, 3D-printing, vacuum forming, or by some other fabrication process or combination of fabrication processes.

The tank 12, tray top 14, and tray base 16 may have sidewall thicknesses of 0.5-4 mm, preferably 0.7-2 mm, more preferably 0.8-1.8 mm, though in some embodiments, the sidewall may be greater than 4 mm or less than 0.5 mm.

The tray base 16 may have a shape generally similar to a rectangular prism. Preferably, the perimeter of the top edge 86 of the tray base encloses a perimeter that is substantially planar with the plane enclosed by the perimeter of the bottom edge 38. Preferably the exterior walls of the tray base 16 are substantially perpendicular with both of these planes. In another embodiment, the exterior walls may be angled by 2°-17°, 3°-15°, or 4°-10° from a perpendicular angle. In alternative embodiments, the perimeter of the top edge 86 and the perimeter of the bottom edge 38 may enclose planes that are not parallel, or the top and/or bottom of the tray base may not have a perimeter enclosing a plane. The exterior walls 88 of the tray base may have a height that is 10-50 mm, preferably 15-40 mm, more preferably 18-25 mm; however, in some embodiments the exterior walls may be shorter than 10 mm or taller than 50 mm. The tray base 16 may have a length or longest dimension of 60-200 mm, preferably 80-180 mm, more preferably 120-170 mm, or about 135 mm. However, in some embodiments, the length may be shorter than 60 mm or longer than 180 mm. The width, or second longest dimension, of the tray base 16 may be 30-100%, preferably 40-80%, more preferably 62-72% of the length, though in some embodiments, the width may be less than 30% of the length.

In a preferred embodiment, the tray base 16 may not have a shape that is exactly a rectangular prism, but may have curved sidewalls or indentations. In one embodiment, indentations in the sidewalls may allow the tray base to secure within a holder, and likewise, the bottom edge 38 may comprise one or more tabs or feet 80 to secure the tray base 16. In one embodiment, the liquid dispenser 10 may be shaped in order to be inserted into a housing, such as a bait box or bait station, used for animal baits. In this embodiment, the liquid dispenser 10 may be considered a "bait station insert," or a "bait box insert." Example bait boxes or bait stations include, but are not limited to, JT EATON, JT EATON RAT FORTRESS, PROTECTA EVO AMBUSH, PROTECTA EVO EXPRESS, and PROTECTA LP bait station.

The tray base 16 comprises a tank basin 18, a drink basin 22, and a spill basin 24. The tank basin 18 is configured to drain a liquid from the tank basin to the drink basin 22, where the liquid is then presented through the drinking area 52 of the tray top 14. In one embodiment, the tank basin 18 may comprise a spike, needle, or lance 50 configured to break a seal covering an opening of a discharge port 72 of a tank 12 being inserted. The interior sidewalls of the tank basin 18 may have a height of 4-20 mm, preferably 5-15 mm, more preferably 6-12 mm, though in some embodiments, the side walls may be shorter than 4 mm or higher than 20 mm. Preferably, the tank basin 18 is substantially circular, except where it connects with the drink basin 22 or with the feeder trough 20. In one embodiment, an inner diameter of the tank basin 18 may be 20-60 mm, preferably 30-50 mm, more preferably 35-45 mm. However, in other embodiments, the tank basin 18 may have an inner diameter smaller than 20 mm or greater than 60 mm, or the tank basin 18 may have a different shape, for instance, an elliptical or a rectangular shape.

The drink basin 22 of the tray base 16 may have a circular shape, or an elongated shape similar to an oval or an ellipse. In a preferred embodiment, the drink basin 22 has an oval shape with a length of 30-100 mm, preferably 40-80 mm, more preferably 50-70 mm, and with a width of 10-40 mm, preferably 15-30 mm, more preferably 17-25 mm. In other embodiments, a drink basin 22 may have a rectangular shape, or some other shape, and in some embodiments, the drink basin 22 may have a length of less than 30 mm or greater than 100 mm, or a width of less than 10 mm or greater than 40 mm. In one embodiment, the drink basin 22 has interior walls 84 with a height of 5-30 mm, preferably 8-20 mm, more preferably 10-17 mm, though in some embodiments, the walls may be shorter than 5 mm or taller than 30 mm. The drink basin 22 may have a volume of 10-40 mL, preferably 12-30 mL, more preferably 13-20 mL, though in some embodiments, the drink basin 22 may have a volume of less than 10 mL or greater than 40 mL.

Figure 2:
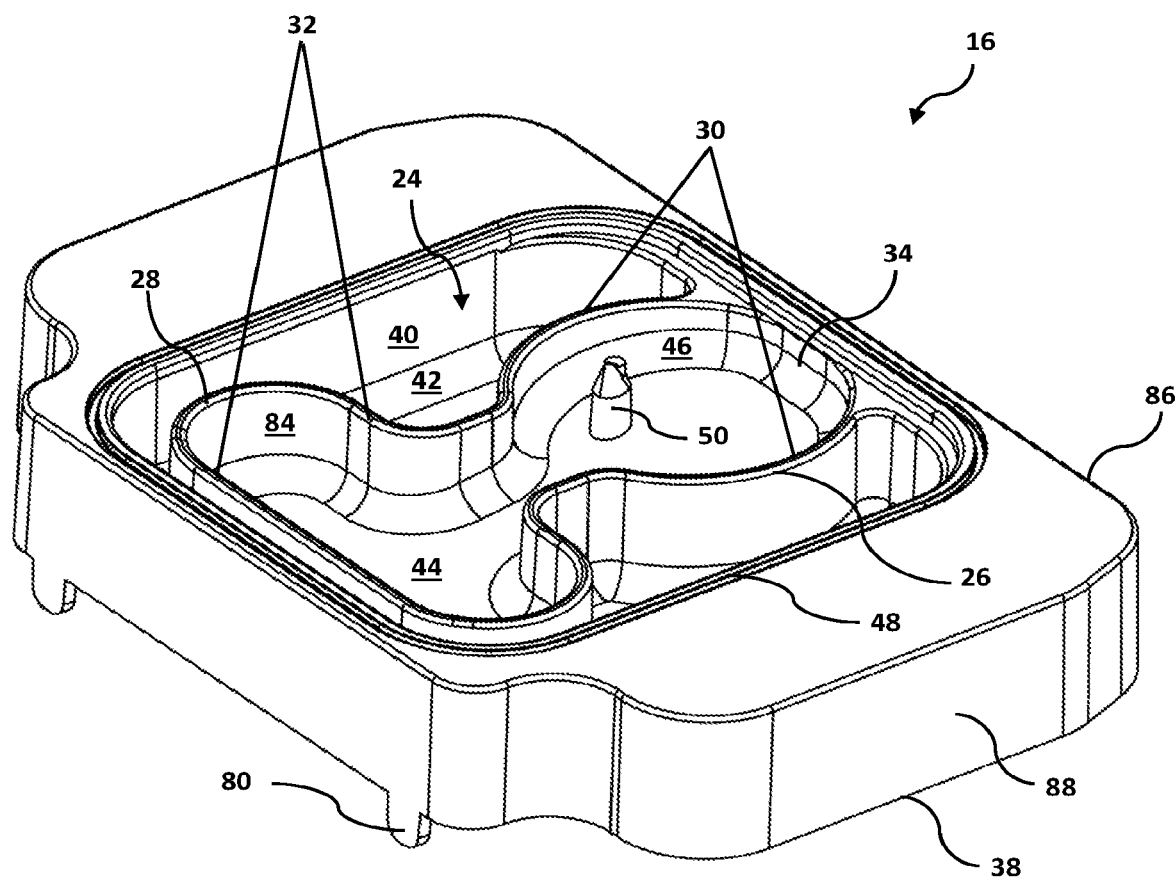
FIG. 2 is a tray base of a liquid dispenser.
Figure 3:
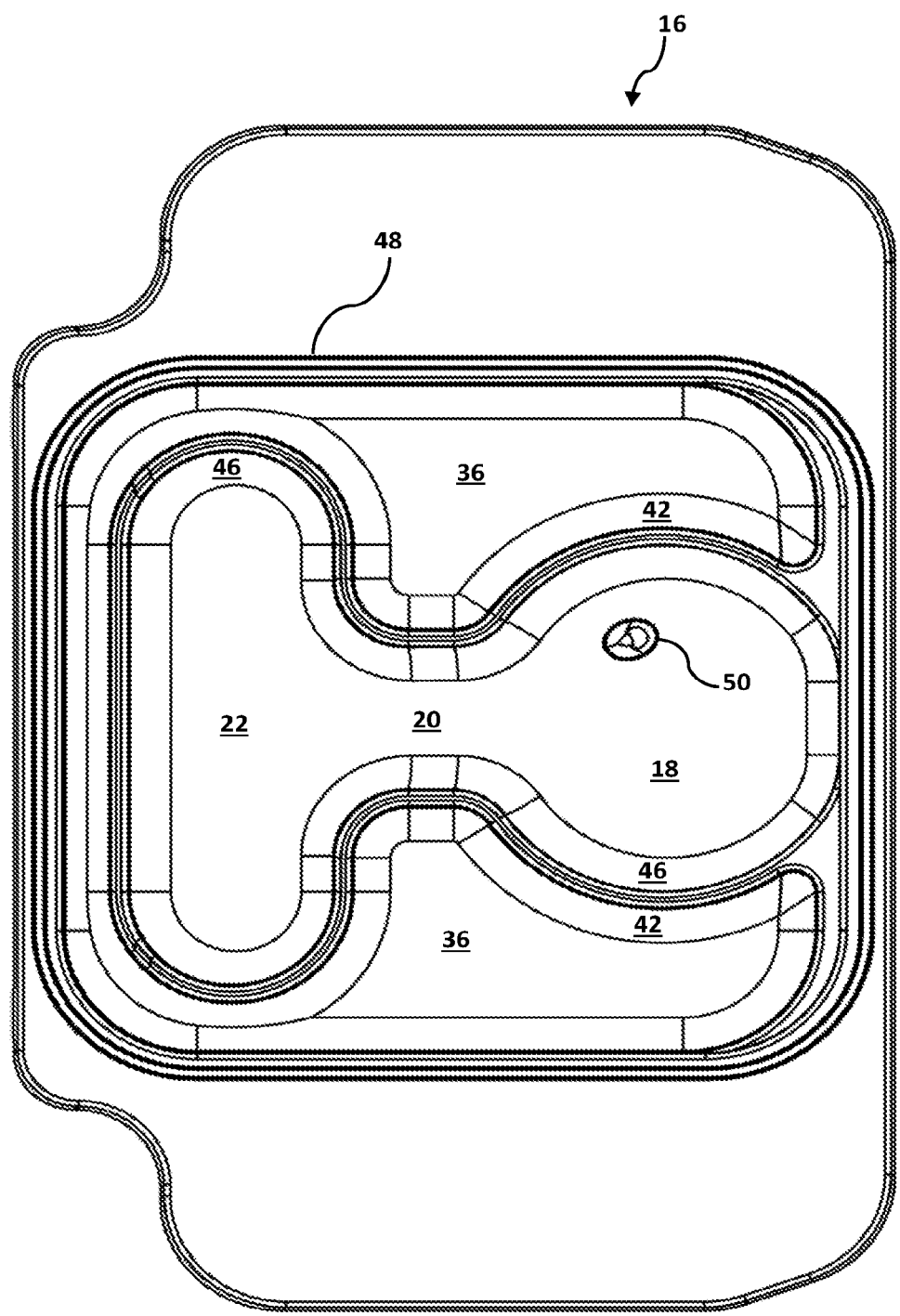
FIG. 3 is a top view of the tray base of FIG. 2.

The tray base 16 also has at least one spill basin 24 adjacent to a perimeter 26 of the tank basin and a perimeter 28 of the drink basin. The at least one spill basin 24 is configured to drain a liquid in the spill basin 24 back to the tank 12 when the liquid dispenser 10 is inverted. The at least one spill basin 24 may have a maximum capacity of 10-100 mL, preferably 20-50 mL, more preferably 30-40 mL, though in other embodiments, the at least one spill basin 24 may have a maximum capacity of less than 10 mL or greater than 100 mL. In one embodiment, two or more spill basins are present and kept isolated from one another. However, in a preferred embodiment, only one spill basin is present. In a further embodiment, only one spill basin 24 is present and is in contact with opposite edges 32 of the drink basin and with opposite edges 30 of the tank basin. An example of this embodiment is shown in FIGS. 2 and 3. As defined here, the opposite edges 32 of the drink basin and opposite edges 30 of the tank basin are those edges that oppose each other across a length or across a width of each basin. Opposite edges may not necessarily oppose each other across the geometric center of the basin.

However, in one embodiment, an edge of the tank basin farthest from the drink basin is connected to a side 34 of the tray base and is not bordered by the spill basin 24. An example of this embodiment is also shown in FIGS. 2 and 3, and this arrangement enables a liquid from the spill basin 24, the drink basin 22, and the tank basin 18 to drain or collect towards the back of the tank basin 18 when the tray base 16 is tilted backwards (i.e. in the direction of rotation that elevates the drink basin 22 and lowers the tank basin 18). When a tray top 14 and tank 12 are present and connected, a liquid that collects towards the back of the tank basin 18 may be drained back into the tank 12.

In one embodiment, a spill basin 24 has one continuous bottom profile 36. For instance, the spill basin 24 may have a planar bottom, or may have a combination of planar, grooved, or curved bottom surfaces that have substantially equal depths. In a further embodiment, a spill basin 24 has a continuous bottom profile 36 that is substantially parallel with a bottom edge 38 of the tray base. An example of this embodiment is shown in FIG. 3, where a single spill basin 24 surrounds the drink basin 22, the feeder trough 20, and most of the tank basin 18. In one embodiment, this type of bottom profile allows a small amount of liquid in the spill basin 24 to spread evenly within the spill basin 24. However, in some embodiments, the spill basin 24 may be tilted or designed so that a small amount of liquid collects in one or more locations within the spill basin 24, rather than spreading throughout.

In one embodiment, where a spill basin 24 has a continuous bottom profile 36, the spill basin has interior walls 40 that connect to the continuous bottom profile 36 through curved bottom edges 42. These curved bottom edges 42 may follow a part of or the entire perimeter of the spill basin. FIG. 3 shows an embodiment where the curved bottom edges 42 follow an entire perimeter of the spill basin. In one embodiment, these curved bottom edges 42 may act as a funnel to direct a liquid from the sides of the spill basin into the bottom of the spill basin. Additionally, the curved bottom edges 42 remove corners that may trap a liquid and prevent it from draining back towards the tank basin 18. The curved bottom edges 42 may have curve similar to having a radius of curvature of 1-6 mm, preferably 2-5 mm, more preferably 4.0-4.8 mm, and a degree of curvature of 110°-90°, preferably 100°-90°. In other embodiments, the curved bottom edges 42 may curve along an elliptical curve or some other curve.

In one embodiment, the tank basin 18 and the drink basin 22 may be directly connected to each other, though in other embodiments, the tank basin 18 and the drink basin 22 may be connected through a feeder trough 20 which is in fluid communication with both the tank basin 18 and the drink basin 22. One example of this embodiment is shown in FIGS. 2 and 3. Preferably, the length of the feeder trough is less than the inner diameter of the engagement port. In one embodiment, the length of the feeder trough is 25-60% of an inner diameter of the engagement port, preferably 30-55%, more preferably 35-50%. In one embodiment, the length of the feeder trough may be 10-50 mm, preferably 12-30 mm, more preferably 15-25 mm, though in some embodiments the feeder trough may be less than 10 mm or greater than 50 mm. The feeder trough 20 may have a width of 8-25 mm, preferably 12-20 mm, and the height of the sidewalls of the feeder trough may be 5-20 mm, preferably 6-17 mm, more preferably 7-16 mm, though in some embodiments, the width of the feeder trough may be less than 8 or greater than 25 mm, and/or the sidewalls may be shorter than 5 mm or taller than 20 mm. Preferably, the tray base 16 comprises only one tank basin 18, only one feeder trough 20, and only one drink basin 22, however, in some variations, one tank basin 18 may connect with more than one feeder trough 20, each delivering a liquid to a separate drink basin 22. In another variation, a tray base 16 may have only one tank basin 18 and only one drink basin 22, but two feeder troughs that connect the drink basin 22 with the tank basin 18. In preferred embodiments, the feeder trough 20 is in line with the geometric centers of the drink basin 22 and the tank basin 18; however, in other embodiments the feeder trough 20 may follow an angled or curved path and may not be in line with the centers of the basins. In another alternative embodiment, a feeder tube or a pipeline may be used instead of a feeder trough. In another alternative embodiment, the feeder trough 20 may comprise a valve or device for measuring or controlling a flowrate of a liquid to the drink basin 22.

As the drink basin 22 and tank basin 18 are bordered by at least one spill basin 24, a feeder trough 20, if present, is also bordered by at least one spill basin 24. Preferably the feeder tough 20 is bordered by a spill basin 24 on both sides, even more preferably the feeder trough 20 is bordered on both sides by the same spill basin 24. An example of this embodiment is shown in FIGS. 2 and 3.

In one embodiment, the drink basin 22, feeder trough 20, and tank basin 18 share a continuous planar bottom 44. This continuous planar bottom 44 is evident in FIGS. 2 and 12. This planar bottom 44 may be substantially planar with the plane enclosed by the bottom edge 38 of the tray base, or may be slanted at an angle. In one embodiment, the continuous planar bottom 44 slopes down towards the drink basin 22 at an angle of 2°-30°, preferably 4°-20°, more preferably 5°-15°, or about 7°, relative to the bottom edge 38 of the tray base. However, in other embodiments, the continuous planar bottom 44 may form an angle of less than 2° or greater than 30°, and/or may slope in a different direction. In one embodiment, the bottom may not be planar, but may be curved down towards the drink basin 22. In another related embodiment, the bottom may not be planar, but instead comprise a groove or a crevice. In one embodiment, the continuous planar bottom 36 sloping down towards the drink basin 22 enables efficient delivery of a liquid from the tank basin 18 to the drink basin 22. Additionally, the downward slope allows the tank 12 to drain completely into the drink basin 22 without any waste of liquid.

In one embodiment, the interior walls 84 of the drink basin, the feeder trough, and the tank basin connect to the continuous planar bottom 44 through curved bottom edges 46. These curved bottom edges 46 may be similar to what was previously described for the curved bottom edges 42 of the spill basin, and may also serve the purpose of directing small amounts of liquid away from the interior walls, or prevent liquid from being trapped in a sharp corner.

For a sloping continuous bottom 44, the interior walls 84 of the drink basin, feeder trough (if present) and drink basin may vary in height. Preferably, however, the walls are not too high to block off the spill basin 24 or to prevent a liquid from the spill basin 24 and/or the drink basin 22 from being returned to the tank basin 18 and tank 12 when the liquid dispenser 10 is tilted back or inverted.

In one embodiment, the tray top 14 and the tray base 16 contact through a complementary fitting 48 that surrounds the spill area 24 and tank basin 18. Preferably, this complementary fitting 48 may be used for attaching the tray top 14 and the tray base 16 by sonic welding. In other embodiments, the complementary fitting may be used with an O-ring seal, or may be sealed or attached with an adhesive. In other embodiments, a complementary fitting 48 may be in the form of a grove and a raised impression, or a tab and a slot, or a snap. Preferably the tray top 14 and tray base 16 are permanently attached, though in some embodiments, they may be removably attached. In other embodiments, the tray top 14 and tray base 16 may connect or fasten through one or more outer walls 88 of the tray base 16, for instance, by a clamp or clip. In an alternative embodiment, a tank 12 may be able to attach directly to a tray base 16 with no need for a tray top 14.

In one embodiment, the tray top 14 may cover the entire top surface of the tray base 16, as shown by the tray top in FIG. 1. However, in other embodiments, the tray top 14 may be limited to the area within the complementary fitting 48, or some area smaller than the top area of the tray base 16.

The tray top 14 has a drinking area 52, preferably with an opening no larger than the area of the drink basin 22. In general, the drinking area 52 may have a similar but smaller shape than the drink basin 22. In one embodiment, the drinking area perimeter may be inset from the drink basin perimeter 28 by 1-10 mm, preferably 2-6 mm, more preferably 3-5 mm. The drinking area 52 may be rectangular, oval, elliptical, circular, or some other shape.

In one embodiment, a perimeter of the drinking area has a downward sloping drink edge 56 configured to be in contact with a liquid dispensed from the tank 12 into the drink basin 22. In one embodiment, the entire perimeter of the drinking area may have a downward sloping drink edge 56, though in other embodiments, only a portion or segments of the perimeter may have a downward sloping drink edge 56. The length of the downward sloping drink edge may be 4-25 mm, preferably 5-20 mm, more preferably 8-12 mm. The downward sloping drink edge 56 may connect to the tray top 14 through a curved surface or an angled surface. In one embodiment, the bottom edge of the downward sloping drink edge may just touch the top surface of a liquid in the drink basin. In other embodiments, the downward sloping drink edge 56 may be submerged in a liquid by 1-10 mm, preferably 2-4 mm. In one embodiment, the drink edge being submerged or touching the liquid may help to reduce evaporation by sealing off part of the liquid headspace.

In one embodiment, rather than the downward sloping drink edge 56 being one continuous surface, the downward sloping drink edge has at least one air vent 58. As mentioned above, the drink edge 56 may help to seal off part of the liquid headspace. However, sealing off the entire perimeter without an air vent may lead to differences in air pressure that create uneven levels of the liquid in the drink basin 22. To prevent the uneven liquid levels while minimizing evaporation, an air vent 58 such as a notch or a hole may be present on the downward sloping drink edge 56 to allow air pressure to equalize. In a preferred embodiment, two air vents 58 are present at opposing sides of the drink edge 56. Preferably, the air vent 58 is rectangular or an inverted U or V shape, and is adjacent to the bottom edge of the drink edge. Preferably the length of the air vent is 30-80%, more preferably 40-70% of the drink edge length. The width of the air vent may be 1-3 mm. In other embodiments, the tray top 14 may have an air vent located elsewhere, in which case an air vent 58 in the drink edge may not be needed.

In alternative embodiments, a moveable cover may be attached to the drinking area 52 and/or the drink basin 22 in order to change the size or shape of the drinking area 52, or to close it off entirely. In another embodiment, a screen or a grating may be attached to the drink basin 22 and/or drinking area 52. This screen or grating may prevent debris from reaching the bottom of the drink basin 22, or may change the presentation of the liquid in such a way as to select for different animals. A screen or grating may furthermore reduce evaporation, and may be removable.

In one embodiment, the tray top 14 has a curved molding 60 connecting a continuous, raised surface 62 surrounding the drinking area 52 and connecting with an outer periphery 64 of the engagement port. In one embodiment, this raised surface 62 may be raised by a height of 1.0-5.0 mm, preferably 1.5-4.5 mm, more preferably 2.0-4.0. In an alternative embodiment, a raised surface 62 may surround a drinking area 52 or connect with an outer periphery 64 of the engagement port, but not both. In another alternative embodiment, two raised surfaces may separately connect with a periphery of a drinking area and with an outer periphery of an engagement port. Preferably, however, where a tray base 16 has a feeder trough 20, preferably the raised surface 62 of the tray top also covers the feeder trough 20.

In one embodiment, the raised surface 62 is designed to allow a gap of 1.0-5.0 mm, preferably 1.5-4.5 mm, more preferably 2.0-4.0 between the raised surface and the sidewalls 84 of the drink basin and the tank basin, and, if present, the feeder basin. This gap improves the ability to drain a liquid back into the tank basin 18 and tank 12, especially when the liquid dispenser 10 is inverted almost or entirely by 180°. Preferably the raised surface 62 does not surround the entire outer periphery 64 of the engagement port.

In one embodiment, the engagement port 54 and the discharge port 72 are removably attached by screw threads 70. The engagement port 54 and the discharge port 72 may instead comprise a nut or a sleeve with a screw thread. In other embodiments, the engagement port 54 and the discharge port 72 may contact through an unthreaded fitting that may be secured and sealed by a clip, a lever, a washer, a spring-loaded latch, and/or an O-ring. The connection may involve a ball-lock coupling, a roller-lock coupling, a pin-lock coupling, a flat-face coupling, a bayonet coupling, a ring-lock coupling, a cam-lock coupling, or some other structure. Alternatively, the tank 12 may just sit within the engagement port 54, similar to the water tank of a water cooler. Preferably the removable attachment allows a user to separate and connect the tank 12 to the engagement port 54 without the use of a tool.

In one embodiment, where the engagement port 54 and the discharge port 72 are removably attached by screw threads 70, the screw threads may be single or double start and may be right-handed or left-handed. The shape of the screw threads may be V, American National, British Standard, buttress, Unified Thread Standard, ISO metric, or some different shape known to those of ordinary skill. In a preferred embodiment, the screw threads may be buttress, or a modified buttress shape.

In one embodiment, the discharge port 72 may have an outer diameter measured without screw threads, also known as an "E" dimension, of 15-60 mm, preferably 20-50 mm, more preferably 28-35 mm. In another embodiment, the diameter from the outermost threads, or "T" dimension, may be 17-62 mm, preferably 25-50 mm, more preferably 31-36 mm, or about 33 mm. In one embodiment, the discharge port 72 may have a single screw thread that makes a single turn, and in a further embodiment, the discharge port may have a 33/400 neck finish.

In one embodiment, rather than the bottom edge of the discharge port being stopped by a flanged surface within the engagement port, the discharge port 72 and the engagement port 54 may have positive stops 68, 74 configured to contact each other to stop insertion or rotation of the tank 12. Preferably, the positive stops 68, 74 contact each other when the tank 12 is securely fastened.

In a related embodiment, an inner circumference 66 of the engagement port 54 seals against an outer circumference 76 of the tank discharge port 72. In this embodiment, since the bottom of the discharge port does not hit a flanged surface, positive stops 68, 74 on the discharge port and the engagement port may contact one another when the discharge port 72 has been sufficiently inserted and sealed. As mentioned previously, the discharge port 72 and engagement port 54 may have screw threads 70 that enable a single turn, though in other embodiments, the screw threads 70 may be configured to allow less than a single turn or more than a single turn.

Figure 10:
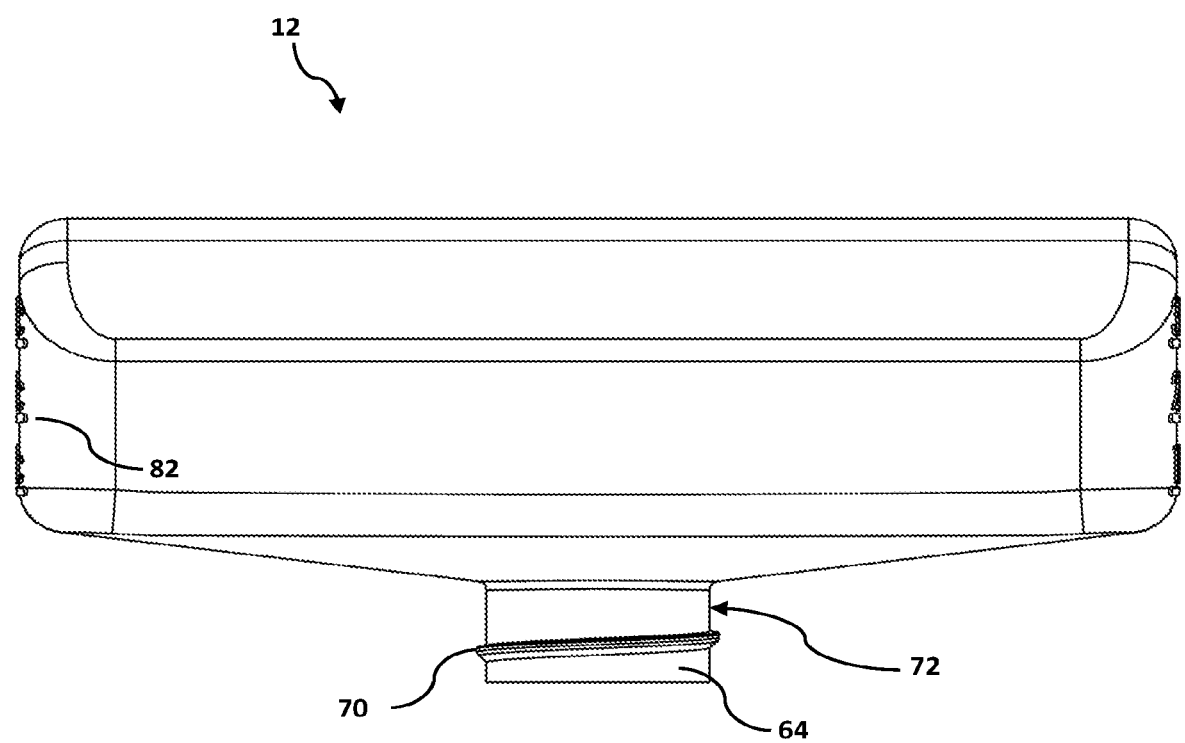
FIG. 10 is a front view of a tank.

In one embodiment, the tank 12 is configured to deliver a liquid from inside the tank through the discharge port 72 and to the tank basin 18. In one embodiment, the tank may have edges that slope or curve towards the discharge port in order to direct small volumes from the tank. One such embodiment is shown in FIG. 10. Preferably the tank 12 is able to maintain a volume in the drink basin 22 by continually refilling as liquid is removed. This refilling action may be considered "self-leveling" of the liquid in the drink basin 22. Preferably the liquid is delivered from the tank 12 by gravity. In alternative embodiments, a tank 12 may not be attached directly to the tray top 14, but instead attached through a length of tubing. In this embodiment, a liquid may be delivered by gravity or siphoning, or by a pump.

The tank 12 may have a brim full capacity of 100 mL-2 L, preferably 200-1.5 L, more preferably 250-550 mL. However, in other embodiments, the brim full capacity of the tank may be less than 100 mL or greater than 2 L, depending on the application of the liquid dispenser 10 and the identity of the liquid. In one embodiment, the tank 12 may have a fill level of a volume lower than the brim full capacity. For instance, the fill level may be a volume that is 80-99%, preferably 85-98%, more preferably 92-97% of the brim full capacity. In one embodiment, the tank 12 may a length of 50-250 mm, preferably 80-200 mm, more preferably 120-180 mm, and a width of 20-120 mm, preferably 40-100 mm, more preferably 50-90 mm. A height of the tank, measured from the end of the discharge port to a top of the tank, may be 30-90 mm, preferably 40-80 mm, more preferably 50-70 mm.

In one embodiment, the tank 12 includes a label or indicia 78 to show a direction for inverting. This indicia 78 may be a symbol, such as an arrow, and may be engraved, embossed, or imprinted on the tank. Alternatively, the label or indicia 78 may be added onto the surface of the tank, for example, as a sticker or an adhesive label. In one embodiment, the label or indicia may be on a top surface of the tank when attached as part of a liquid dispenser, in order to increase visibility. In another embodiment, one or more sides of the tank may include volumetric markings 82 to indicate a volume of the liquid inside. For a tank that has volumetric markings 82 on the outside, preferably the tank has a sidewall that allows some transmittance of visible light (for instance, a transmittance of 30-80%, or 40-70%) so that the level of liquid in the tank is at least partly visible. In another embodiment, a tank 12 may have volumetric markings 82 with a sidewall that is substantially opaque except for a portion near the volumetric markings. In other embodiments, the tank 12 may be configured with a floating level or some other device to indicate a liquid volume.

Figure 11:
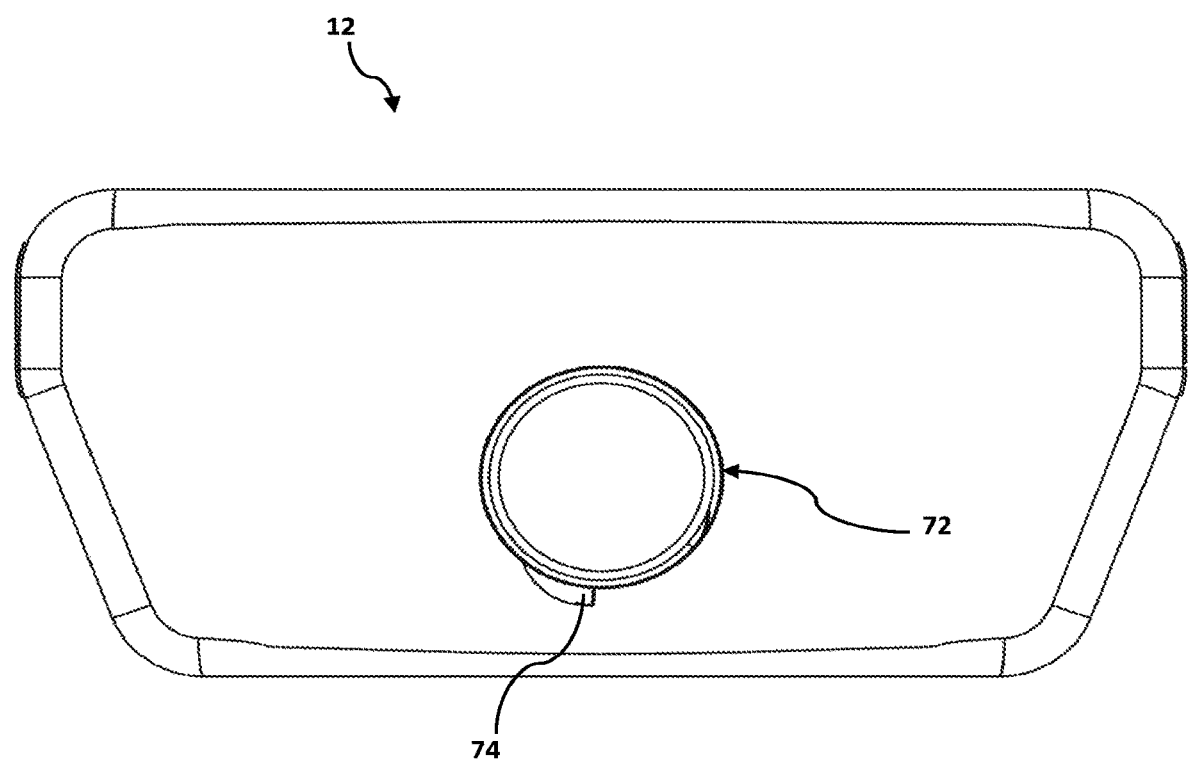
FIG. 11 is a bottom view of a tank and its discharge port.
Figure 12:
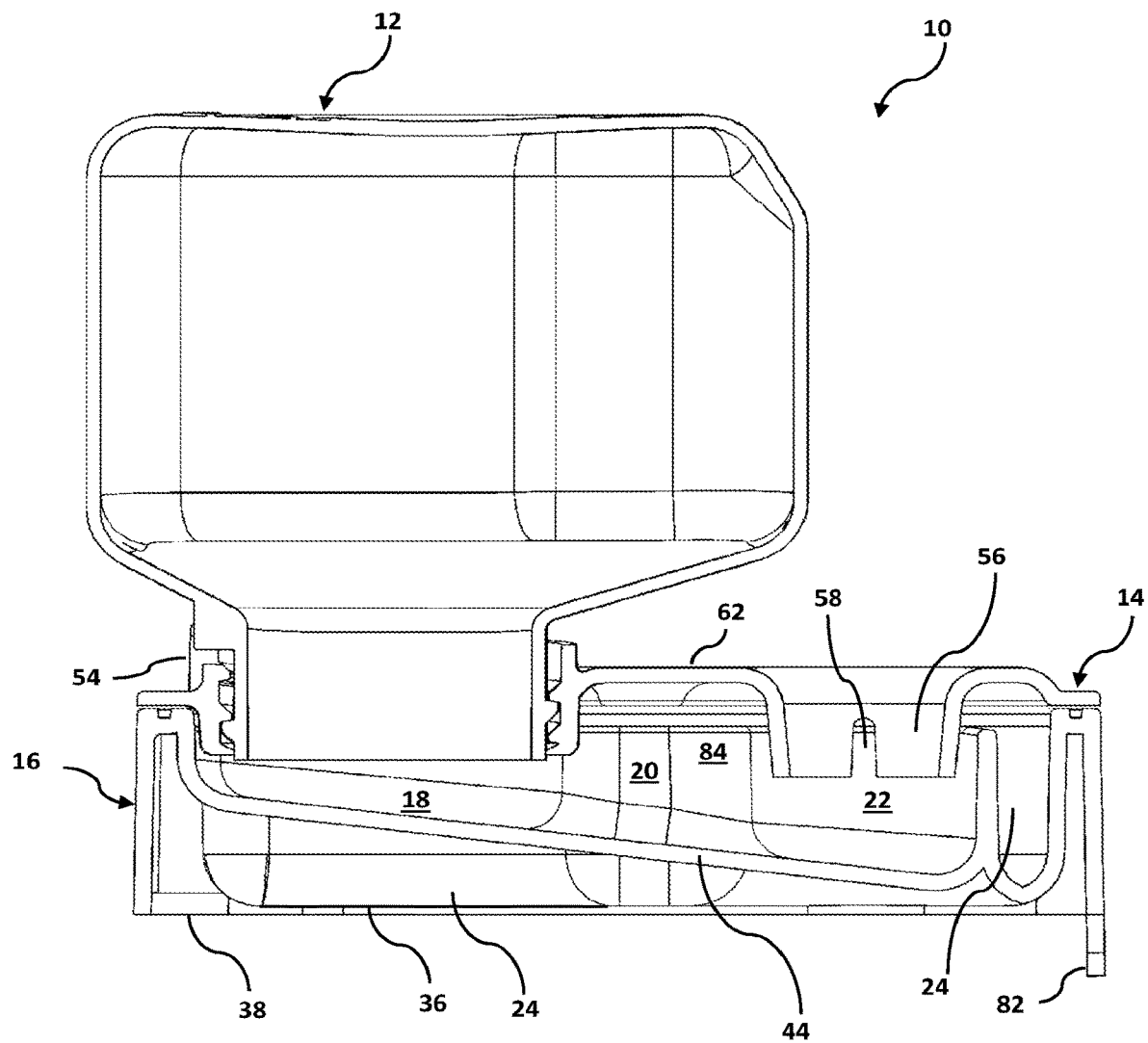
FIG. 12 is a sectional view of the liquid dispenser of FIG. 1.

In one embodiment, the top surface of the tank may be planar. More specifically, the top surface of the tank may be planar and substantially parallel with a plane enclosed by an outer circumference 64 of the discharge port. In this embodiment, the tank may be packaged, stored, and/or sold separately with the tank inverted, with the top surface on the bottom and the discharge port facing up. This enables greater stability for handling a separated tank, and if the tank sides form rectangular or trapezoidal shapes as shown in FIGS. 11 and 12, as opposed to rounded or cylindrical shapes, multiple separated tanks may be packed closely together.

In one embodiment, a tank 12 packaged separately and enclosing a liquid may further comprise a seal or cap over the opening of the discharge port 72. In a preferred embodiment, the discharge port 72 has a frangible seal, and the tank basin 18 has a lance 50, spike, needle, or some protrusion configured to puncture the seal when the tank 12 is attached to the engagement port 54. In one embodiment, the lance 50 may be positioned off center so that the lance 50 cuts an arc into the seal of a tank being twisted on. The arc may have a central angle of 20°-280°, preferably 30°-220°, more preferably 50°-150°. In another embodiment, a lance 50 may be positioned near the center of the tank basin 18, so that twisting a tank on does not cut an arc into the seal but instead punctures a hole in a center of the seal. Here, the lance 50 may be hollow, similar to a syringe needle, or may have grooves or channels on its side to provide a liquid flow path. A lance 50, spike, or needle may have a length of 5-15 mm, preferably 7-13 mm, more preferably 8-12 mm, and in some embodiments, more than one lance, spike or needle may protrude from the tank basin 18.

Where a tank 12 comprises a frangible seal and the tank basin 18 has a lance 50, the tank 50 may be inserted with the discharge port 72 facing downwards, without any liquid flowing out of the tank until the seal is broken. Alternatively, the tank 12 may be inserted with the discharge port 72 facing upwards, with the tray base 16 and tray top 14 being inverted. After fastening, the liquid dispenser 10 may then be turned to a preferred position as in FIG. 1. In the case where the tank basin 18 is sealed with a removable cap, the cap may be removed, and the tank 12 may be attached with the discharge port 72 facing upwards, as described.

As mentioned earlier, the liquid dispenser 10 has a spill basin 24, drink basin 22, and, if present, a feeder trough 20 configured to drain a liquid back into the tank basin 18, and may further drain a liquid from the tank basin 18 into the tank 12 if further inverted. The liquid dispenser 10 may be turned and drained in this way in order to replace a tank 12, or in order to empty the spill basin 24. If the existing tank 12 has sufficient liquid, an inverted tank may be positioned right side up in order to refill the drink basin 22. Thus, liquid from the spill basin can be easily transferred to either or both the tank 12 or the drink basin 22.

In a preferred embodiment, the liquid dispenser 10 may be configured to deliver a liquid bait to small mammals and rodents, such as mice and rats, for the purpose of population control, and in a further embodiment, this liquid bait may have a contraceptive effect which decreases an animal's reproductive ability. Alternatively, the liquid dispenser 10 may deliver a liquid bait to other pests, such as mosquitos and other insects. However, it is equally envisioned that other embodiments of the liquid dispenser 10 may be suitable for a variety of uses. For instance, a liquid dispenser 10 may be configured to deliver water or liquid nutrition to animals in captivity, to animals kept as pets, or to animals in the wild. For instance, the liquid dispenser may be used to supply water or a liquid nutrition to dogs, cats, ferrets, squirrels, rabbits, bats, birds (including humming birds), or other animals. The liquid dispenser may additionally be configured for the self-watering of certain plants.

In other alternative embodiments, the liquid dispenser 10 may be used to dispense any variety of substances, for instance, liquid foods such as a dipping sauce, oil, or vinegar; liquid pigments such as ink and paint; volatile fragrance; or cosmetic substances such as soap, lotion, hand sanitizer, or hair gel. In these embodiments, the liquid dispenser 10 may further comprise a lid or closure to keep the liquid within the tray base 16 and/or to prevent evaporation. However, in the case of a volatile fragrance or related substances where evaporation may be a preferred function, the liquid opening may be shaped to provide a larger surface area for evaporation, or may have an adjustable size to control evaporation rate. Where evaporation is preferred, the liquid dispenser 10 may further comprise a wick or a sponge to absorb the volatile substance and expose it to a greater surface area.

Referring now to the drawings, wherein like reference numerals designate identical or corresponding parts throughout the several views:

FIG. 1 is a liquid dispenser 10 having a tray base 16, a tray top 14, and a tank 12. The bottom edge 38 is visible, along with the raised surface 62 of the tray top, and the downward sloping drink edge 56.

FIGS. 2 and 3 show a tray base 16 of a liquid dispenser. Within the complementary fitting 48 on the tray base is the drink basin 22, feeder trough 20, and tank basin 18. Here, a single spill basin 24 is adjacent to opposing sides of the drink basin 22 and opposing sides of the tank basin 18. The tank basin 18 and drink basin 22 are connected through a feeder trough 20, and all three are surrounded by the single spill basin 24, except for the edge of the tank basin 34 farthest from the drink basin. The spill basin 24 has a sidewall 40 that meets a continuous bottom profile 36 through a curved bottom edge 42. The sidewall 84 of the drink basin, feeder trough, and tank basin also meets a planar bottom 44 through a curved bottom edge 46, and this planar bottom 44 slopes down towards the drink basin 22. The tray base 16 has a planar bottom edge 38 with the exception of locator feet. Both the perimeter 26 of the tank basin and the perimeter of the drink basin 28 are lower than the complementary fitting 48. In this embodiment, the tank basin 18 also comprises a lance 50.

Figure 4:
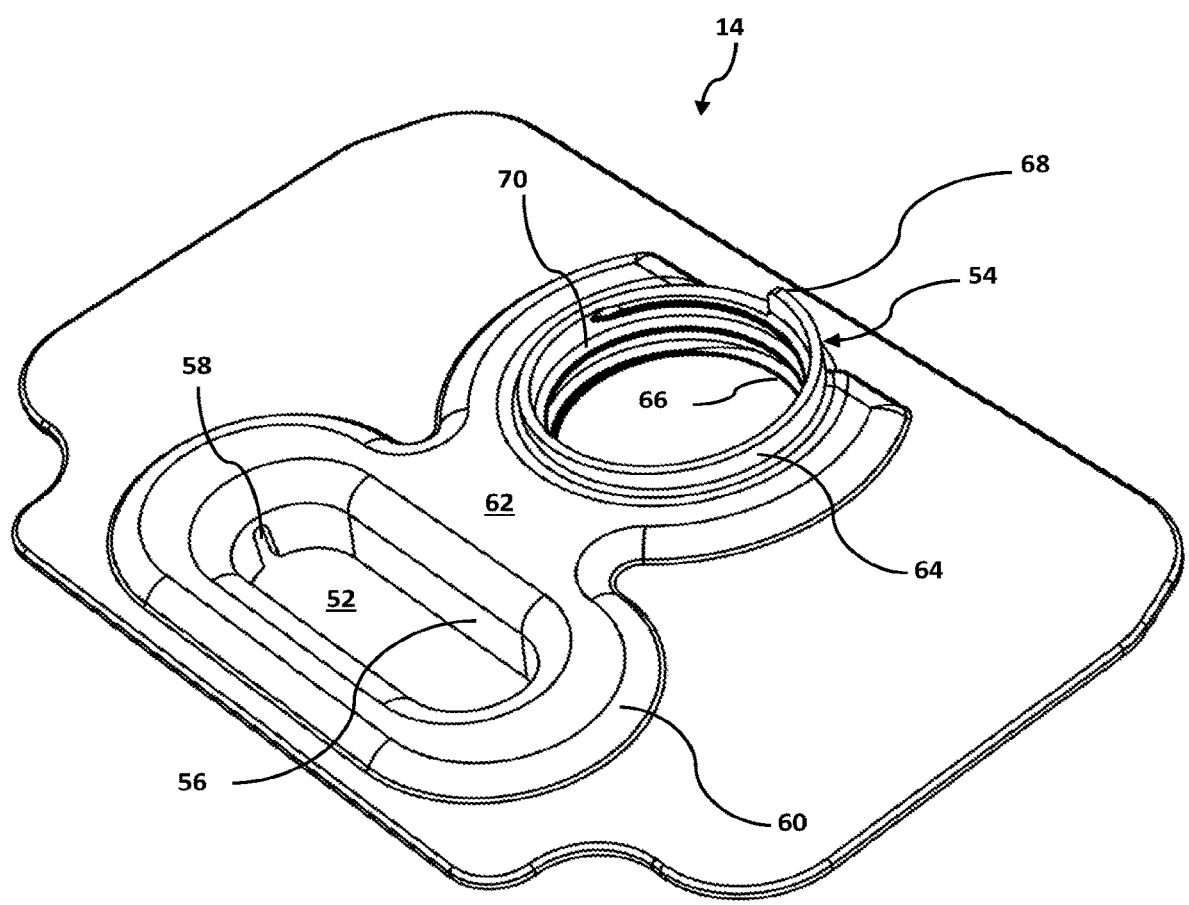
FIG. 4 is a tray top of a liquid dispenser.
Figure 5:
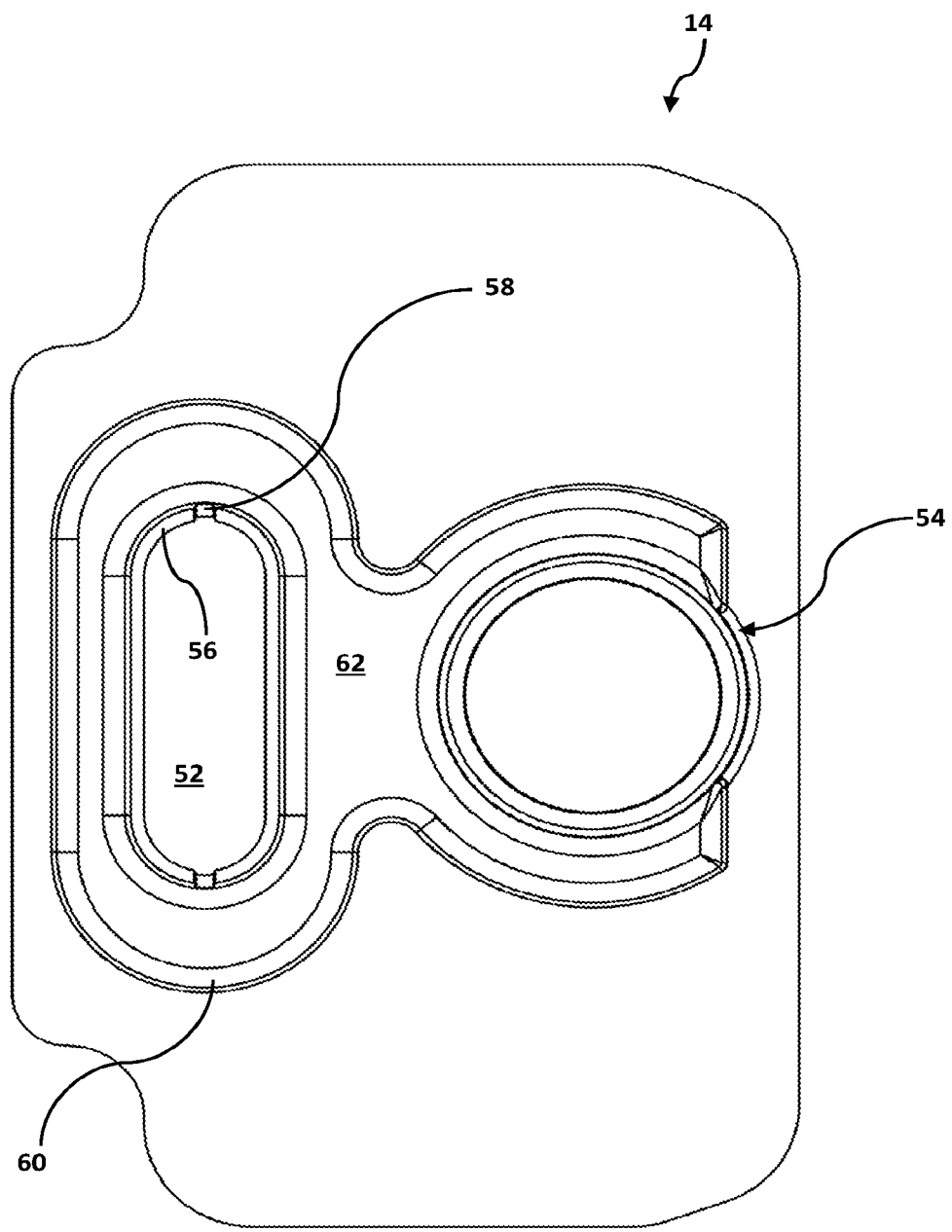
FIG. 5 is a top view of a tray top.
Figure 6:
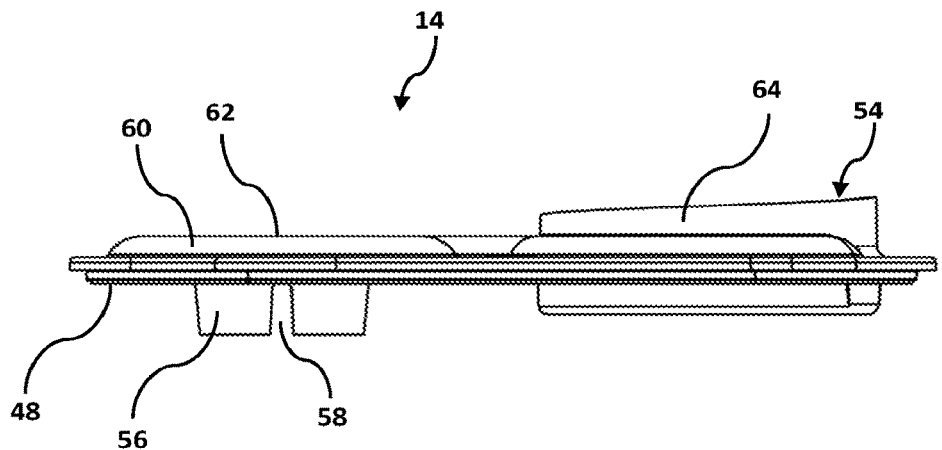
FIG. 6 is a side view of a tray top.
Figure 7:
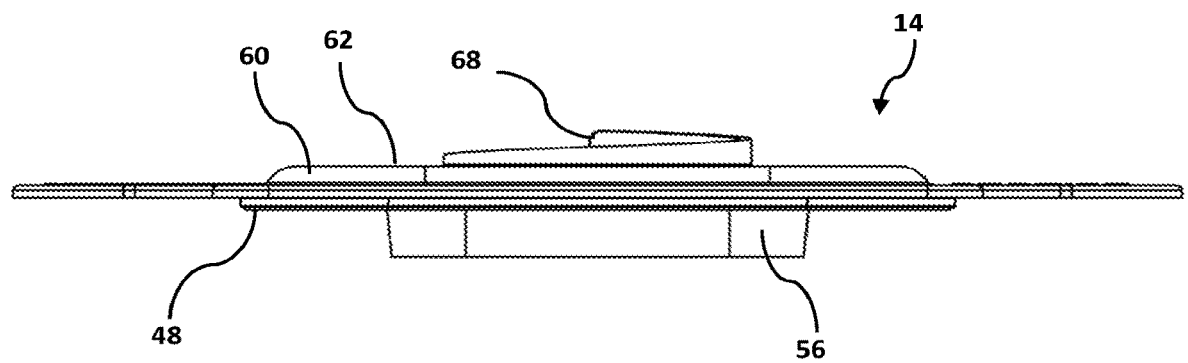
FIG. 7 is a front view of a tray top.

FIG. 4 is a tray top 14 of a liquid dispenser 10 having a drinking area 52 and an engagement port 54. FIGS. 5, 6, and 7 show top, side, and front views, respectively, of the same tray top 14. A raised surface 62 surrounds the drinking area 52 and a portion of the outer periphery 64 of the engagement port, and the raised surface 62 is connected to the tray top 14 by a curved molding 60. The drinking area 52 has a downward sloping drink edge 56 with an air vent 58. The engagement port 54 has a screw thread 70, a positive stop 68, and an inner circumference 66.

Figure 8:
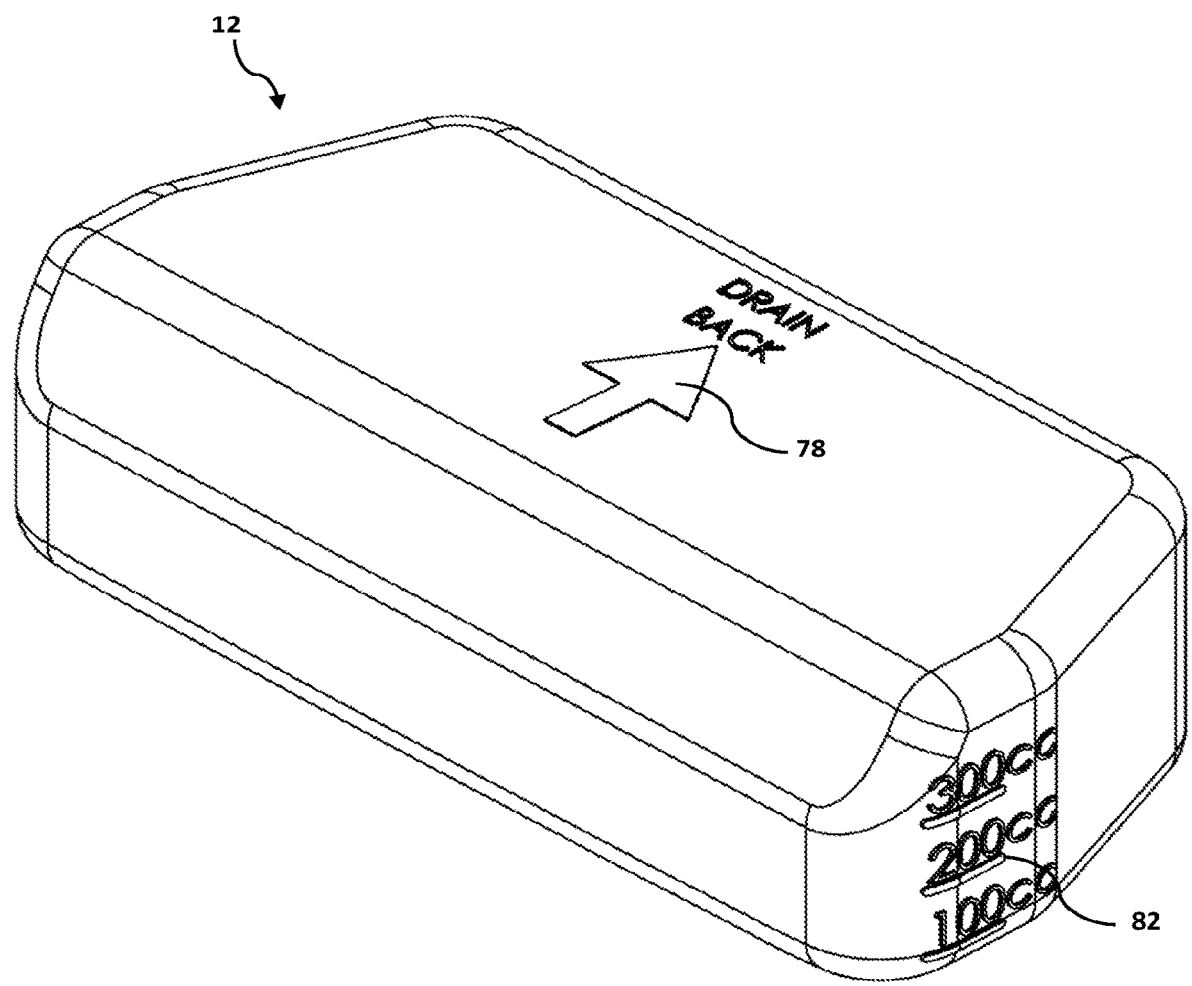
FIG. 8 is a tank of a liquid dispenser.
Figure 9:
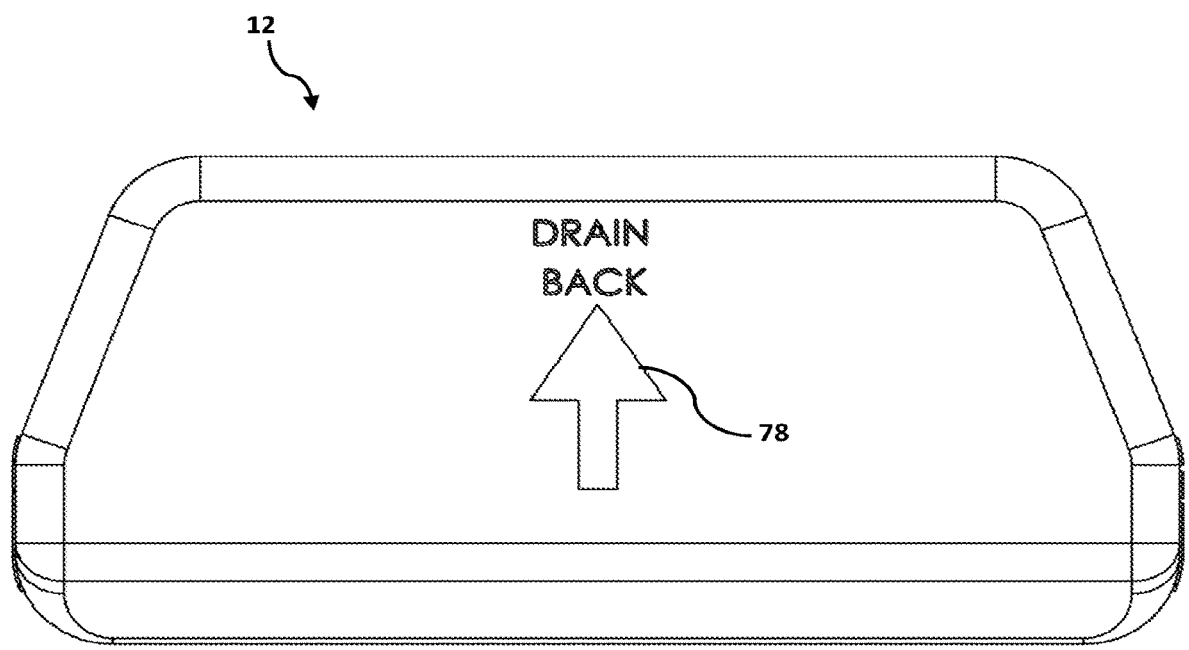
FIG. 9 is a top view of a tank.

FIG. 8 is a tank 12 of a liquid dispenser, with FIGS. 9, 10, and 11 showing top, front, and bottom views, respectively, of the same tank. The tank 12 has indicia 78 to show the direction to tilt the liquid dispenser 10 to drain liquid back into the tank basin 18 and into the tank 12, as well as volume markings 82. The discharge port 72 has a screw thread 70 to engage with the engagement port 54 of the tray top 14, as well as a positive stop 74 configured to contact the positive stop 68 of the engagement port when tank 12 has been sufficiently attached.

Figure 13:
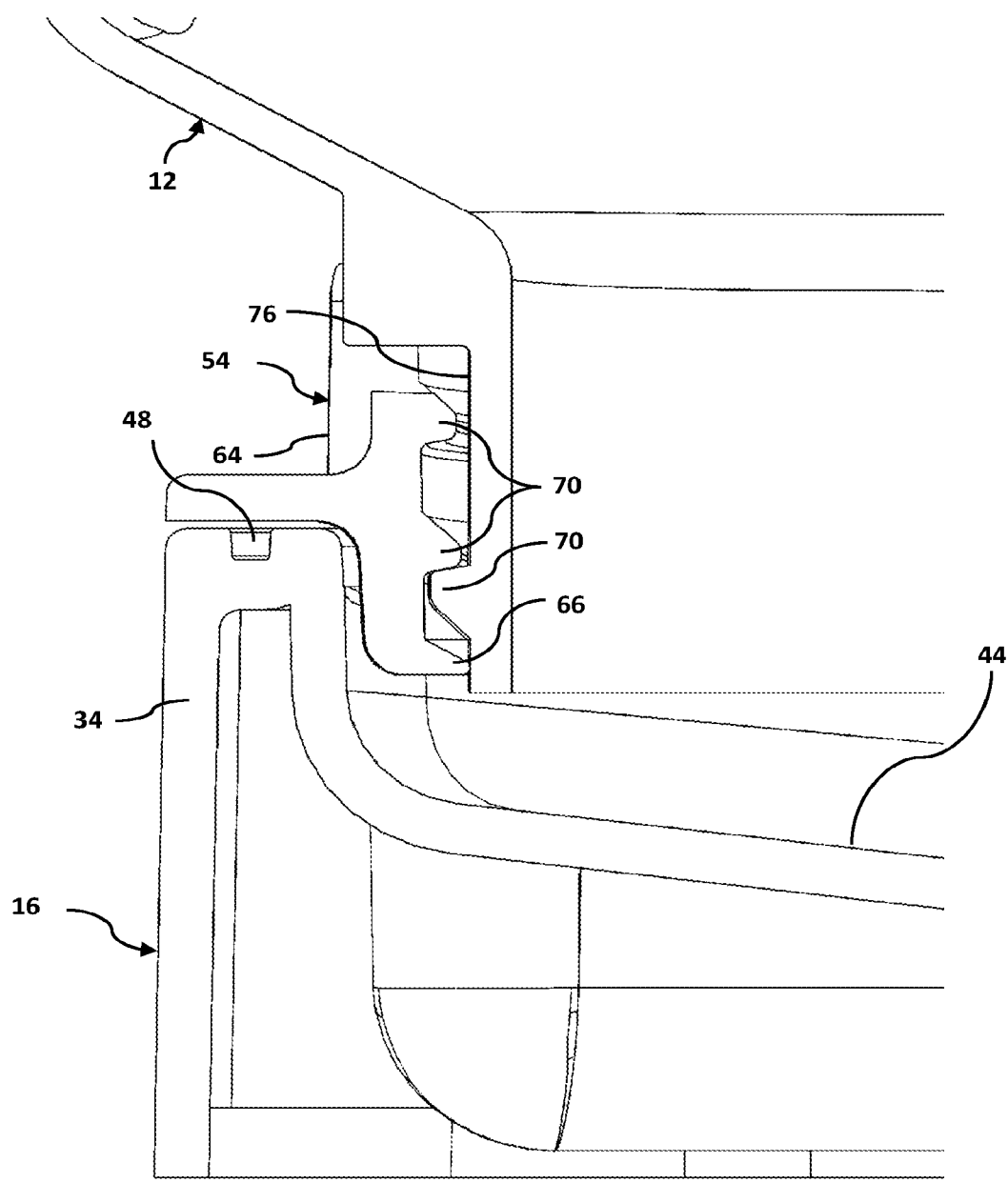
FIG. 13 is a zoomed in view of FIG. 12.

FIG. 12 is a sectional view of the liquid dispenser 10 similar to FIG. 1, and FIG. 13 shows a zoomed-in view of FIG. 12. The tank 10 is attached to the engagement port 54 of the tray top 14, and the tray top 14 is attached to the tray base 16 through the complementary fittings 48, which in this case may be adhered by sonic welding. The bottom profile 36 of the spill basin 24 is substantially planar with the perimeter of the bottom edge 38 of the tray base 16. The bottom surface 44 of the tank basin, feeder trough, and drink basin is also planar, but rather than being substantially planar with the bottom edge 38 of the tray base, the bottom surface 44 declines towards the drink basin 22, at an angle of about 7° relative to the bottom edge 38 of the tray base. The tray top 14 has a raised surface 62, which allows a gap between the tray top 14 and the interior walls 84 of the drink basin and feeder trough. From the raised surface 62, a downward sloping drinking edge 56 protrudes towards the drink basin 22, and has one air vent 58. Furthermore, in this embodiment, the tank basin 18 does not have a lance.

The zoomed-in view of FIG. 13 shows greater detail of the screw thread attachment between the discharge port 72 of the tank 12 and the engagement port 54 of the tray top 14. The screw threads 70 in this case may be buttress type, or modified buttress. An outer circumference 76 of the discharge port may form a seal against an inner circumference of the engagement port 66, and positive stops on the discharge port 74 and engagement port 68 may contact each other and prevent further turning when this seal is obtained. The zoomed-in view also shows that the perimeter of the tank basin farthest from the drink basin is adjacent to a side of the tray base 34, rather than being adjacent to a spill basin at that point.

The invention claimed is:

1. A liquid dispenser, comprising:
 a tank with a discharge port;
 a tray top having a drinking area and an engagement port engaged with the discharge port; and
 a tray base attached to the tray top, wherein the tray base comprises
  a tank basin in fluid communication with a drink basin and
  at least one spill basin adjacent to a perimeter of the tank basin and a perimeter of the drink basin,
 wherein the at least one spill basin is configured to drain a liquid in the spill basin back to the tank when the liquid dispenser is inverted,
 wherein the tray top includes a raised surface, the raised surface surrounding an entire perimeter of the drinking area and extending continuously from the perimeter of the drinking area to an outer periphery of the engagement port,
 wherein the tank basin is connected to the drink basin through a feeder trough, the feeder trough bordered on both sides by the at least one spill basin, and
 wherein the feeder trough is in line with geometric centers of each of the drink basin and the tank basin.

2. The liquid dispenser of claim 1, wherein only one spill basin is present and is in contact with opposite edges of the drink basin and with opposite edges of the tank basin.

3. The liquid dispenser of claim 2, wherein an edge of the tank basin farthest from the drink basin is connected to a side of the tray base and not bordered by the spill basin.

4. The liquid dispenser of claim 2, wherein the spill basin has one continuous bottom profile.

5. The liquid dispenser of claim 4, wherein the continuous bottom profile is substantially parallel with a bottom edge of the tray base.

6. The liquid dispenser of claim 4, wherein the spill basin has interior walls that connect to the continuous bottom profile through curved bottom edges.

7. The liquid dispenser of claim 1, wherein the length of the feeder trough is 25-60% of an inner diameter of the engagement port.

8. The liquid dispenser of claim 1, wherein the drink basin, feeder trough, and tank basin share a continuous planar bottom.

9. The liquid dispenser of claim 8, wherein the continuous planar bottom slopes down towards the drink basin at an angle of 2.degree.-30.degree. relative to a bottom edge of the tray base.

10. The liquid dispenser of claim 8, wherein interior walls of the drink basin, the feeder trough, and the tank basin connect to the continuous planar bottom through curved bottom edges.

11. The liquid dispenser of claim 1, wherein a perimeter of the drinking area has a downward sloping drink edge configured to be in contact with a liquid dispensed from the tank into the drink basin.

12. The liquid dispenser of claim 11, wherein the downward sloping drink edge has at least one air vent.

13. The liquid dispenser of claim 1, wherein the tray top has a curved molding connecting the raised surface with a top surface of the tray top.

14. The liquid dispenser of claim 1, wherein the tray top and the tray base contact through a complementary fitting that surrounds the at least one spill basin and tank basin.

15. The liquid dispenser of claim 1, wherein the engagement port and the discharge port are removably attached by screw threads.

16. The liquid dispenser of claim 15, wherein the discharge port and the engagement port have positive stops configured to contact each other when the tank is securely fastened.

17. The liquid dispenser of claim 15, wherein an inner circumference of the engagement port seals against an outer circumference of the tank discharge port.

18. The liquid dispenser of claim 1, wherein the tank basin comprises a lance configured to break a seal covering an opening of a discharge port of a tank being inserted.

19. The liquid dispenser of claim 1, wherein the tank includes a label or indicia to show a direction for inverting.

* * * * *